Dec. 16, 1958 — T. ULRICH — 2,864,430
SELF ADJUSTING SPRING ARRANGEMENT
Filed July 13, 1953 — 2 Sheets-Sheet 1
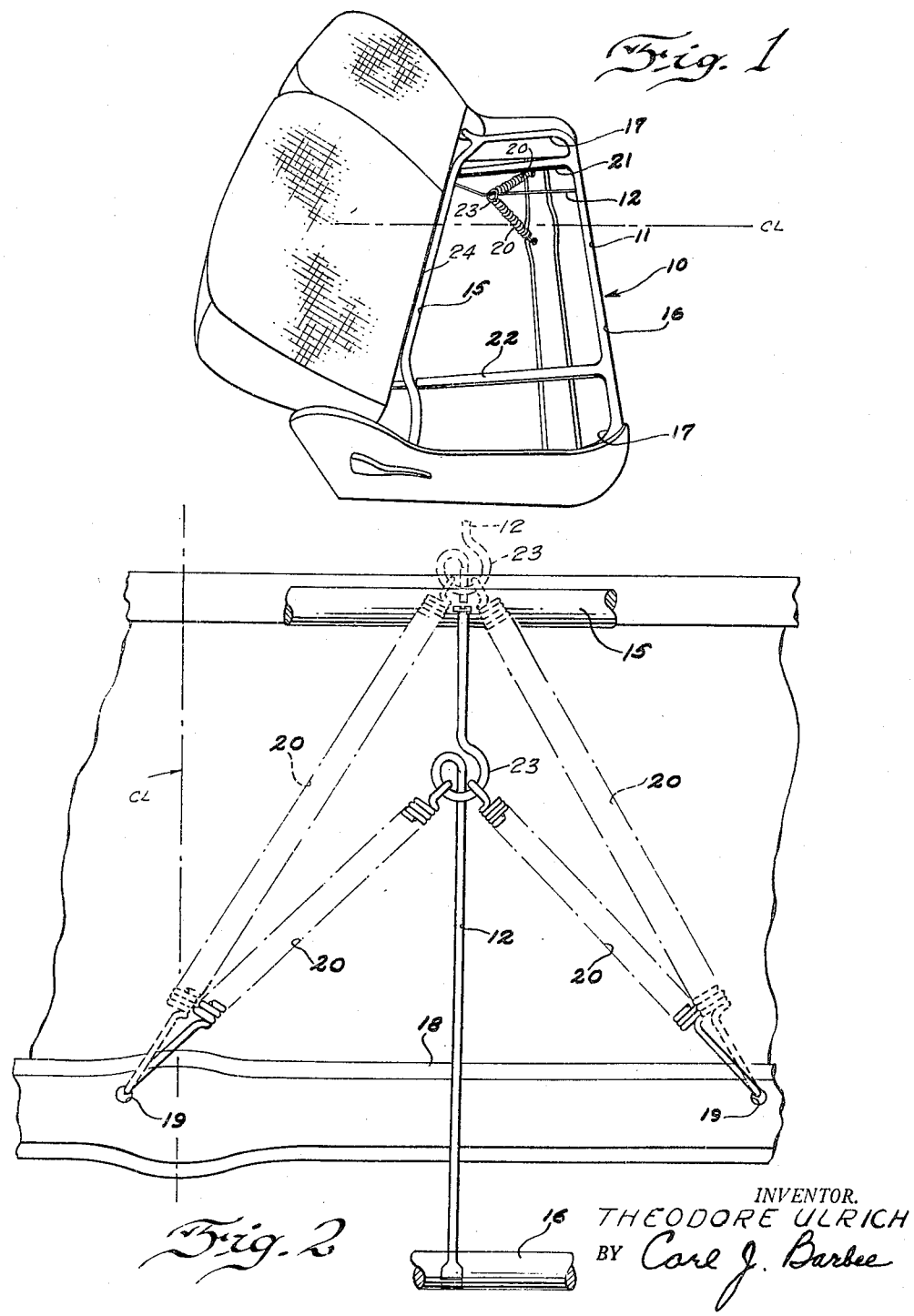
INVENTOR.
THEODORE ULRICH
BY Carl J. Barbee Dec. 16, 1958      T. ULRICH      2,864,430
SELF ADJUSTING SPRING ARRANGEMENT Filed July 13, 1953      2 Sheets-Sheet 2

INVENTOR.
THEODORE ULRICH
BY Carl J. Barber

United States Patent Office 2,864,430
Patented Dec. 16, 1958

2,864,430
SELF ADJUSTING SPRING ARRANGEMENT

Theodore Ulrich, Detroit, Mich., assignor to American Motors Corporation, a corporation of Maryland Application July 13, 1953, Serial No. 367,598

5 Claims. (Cl. 155—14)

The invention relates to automobile seats and has as its principal object the provision of a front seat which is adjustable forwardly or rearwardly relative to its supporting floor.

I am aware that an arrangement for moving said seat over the floor of an automobile is not broadly new. Under the circumstances it will be manifest that it is my chief aim to generally improve upon prior structures of this type.

One of the features of the present invention is that the driver is able to move the seat with a minimum of effort and time.

The usual and well known construction heretofore used has consisted of two spaced coil springs one arranged adjacent each end of the seat frame or more specifically one underneath the seat occupied by the driver, and one occupied by a passenger. As far as occupancy of the car is concerned, a greater proportion of the time is taken up by the driver occupying the seat alone. Under these circumstances, moving of the seat against the old form of spring arrangement requires much effort. The arrangement, therefore, under the present circumstances places the springs within easy control of the driver and accordingly lessens time and effort in manipulation.

The present invention is also characterized by a pair of coil springs arranged in the form of a V with each similar opposed free end secured to a permanently fixed channel or support on the floor of the automobile and the opposite ends, which constitute the apex of the V, secured to an eye-shaped intermediate section integrally formed in a cross member secured to the opposed longitudinally extending tubular rails making up part of the seat frame.

The invention possesses other objects and advantages, some of which with the foregoing, will be set forth in the following description of the preferred form of the invention which is illustrated in the drawings accompanying and forming part of the specification. It is understood, however, that variations in the showing made by the said drawings and description may be adapted within the scope of the invention as set forth in the claims.

Referring to the drawings:

Figure 1 is a perspective view showing the arrangement of my invention with respect to a full front seat structure less the seat cushion.

Figure 2 is an enlarged fragmentary view of a portion of the seat frame showing certain parts of the operating mechanism making up my invention with the springs of my present invention in both retracted and extended position.

Figure 3:
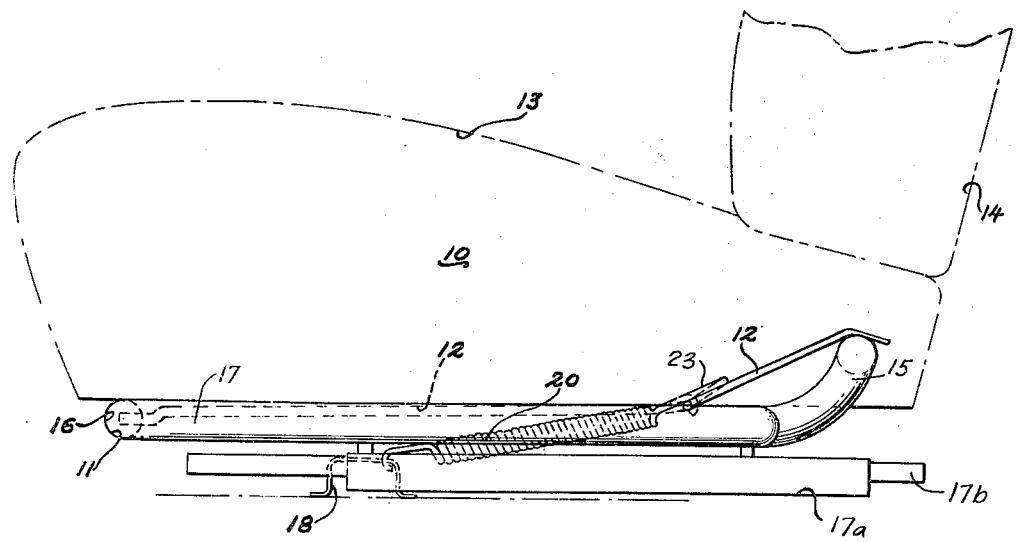
Figure 3 is an end view of the seat frame, the cushion and a portion of the back being shown in phantom.
Figure 4:
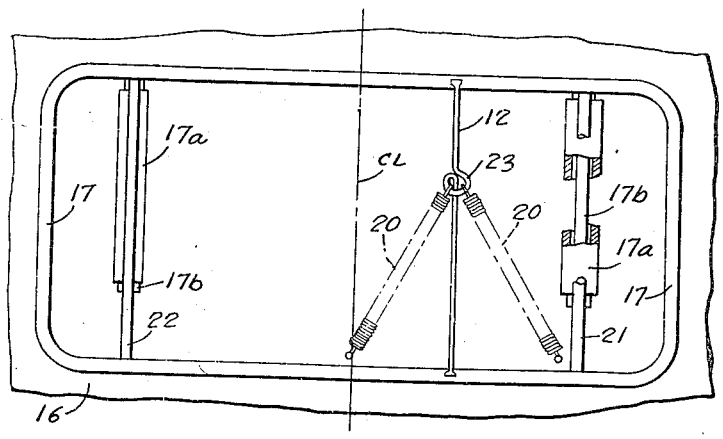
Figure 4 is a plan view of the seat frame with certain parts shown in section, such view being similar to Figure 2 and being on a scale which is reduced from that of Figure 2.

Referring now in detail to the drawings, a vehicle seat is indicated generally at 10 in Figure 1. The seat comprises the seat frame 11 upon which is mounted the seat cushion 13 and to which is secured the seat back 14.

Considering now the construction shown in the drawings, the seat frame 11 includes the front and rear tubular rails 16 and 15 respectively which are fastened together by the transverse end rails 17. Rail 15 is bent upwardly near each end to provide the elevated intermediate portion 24. Permanently mounted to the floor panel is a channel shaped beam 18 provided with a pair of spaced apertures 19 to receive similar shaped ends of a pair of coil springs 20 which are anchored thereto. These apertures 19 are spaced a considerable distance apart with one arranged adjacent the brace 21 on the driver's side of the seat and the other extending just beyond the center line CL of the seat and into the section of a seat reserved for a passenger.

Braces 21 and 22 are secured at each end to the rails 15 and 16 in any suitable manner and are spaced between the end rails 17. Braces 21 and 22 are each anchored to a rack 17a (only one of which is shown in Fig. 3) and each rack is slidably carried for forward and rearward rectilinear movement on the guide rails 17b (only one of which is shown in Fig. 3), the guide rails being anchored to the floor. This construction is well known in the art. A spring support rod 12 is arranged under the driver's side of the seat and is secured at each end to the tubular bars 15 and 16 in any suitable manner. Rod 12 is bent adjacent the tubular bar 15 into the form of an eye 23. The sides of the eye are arranged on each side of the normal line of direction of said rod 12 and provide sufficient space in each instance to receive and anchor each free end of said coil springs 20 so that the springs do not interfere with the rod during forward and backward movement of the seat. Due to the spacing of the apertures 19 the forward ends of the springs are spread apart and the springs converge toward the eye 23 in the manner of a V.

It will be noted that the rod 12 is bent at the eye so that portion of the rod ahead of the eye lies in substantially a horizontal plane and the plane of the springs likewise is more nearly horizontal than they would otherwise be. This reduces the amount of vertical thrust existing between the racks 17a and the guide rails 17b and thereby facilitates adjustment of the seat.

The particular spring arrangement thereby provides a construction where a driver is enabled to more easily proceed to adjust a seat parallel with the floor of a car in backward or forward direction. Unlike the usual construction where the springs are wholly disposed on each side of the center line CL, the invention contemplates a spring arrangement where the force of the springs are mainly concentrated on the driver side. In this way the driver is not fighting the force of a spring situated in a remote area from where the driver is sitting. By arranging the springs in the manner of a V with the forward ends thereof spaced apart substantially at the ends in which the direction of pull on the seat frame is exerted, there is less tendency for the seat frame to become "cocked" relative to its guide rails. This is true although the springs are common in length, strength and in angular disposition relative to the axis of rod 12. Apparently the reason for this is that when the seat starts to assume a "cocked" position relative to the guide rails 17b, a slightly increased pull is exerted by that spring which is more extended and a slightly decreased pull is exerted by the spring which is more contracted. Thus the springs in attempting to seek normalcy (or equal pulling force for each) assist in combating the tendency of a binding condition to exist between the rack 17a and its guide rail 17b.

It is thought that the construction, manipulation, utility, and advantages of this invention will now be apparent to those skilled in this art without a more detailed description thereof.

It will be apparent that changes in the details of construction, and in the combination and arrangement of parts may be resorted to without departing from the spirit or scope of the invention as hereafter claimed or sacrificing any of its advantages.

Having thus described my invention, what I claim is:

1. For use with an automotive vehicle having a floor, a seat assembly comprising: guide rails spaced from each other and anchored to the floor; a seat frame carried on the guide rails and movable rectilinearly forwardly and rearwardly relative thereto, said frame including a front rail and a rear rail spaced from each other and extending crosswise of the vehicle floor and side rails interconnecting the front and rear rails at the opposite ends thereof, said frame in the lengthwise and axial direction of the front and rear rails being of sufficient length to accommodate at least two human passengers in side by side relationship thereby defining a driver's sitting area and an adjacent passenger's sitting area; means for lessening the tendency of the seat frame to deviate from a rectilinear path of movement relative to the guide rails and for urging the frame forwardly relative to the guide rails and the floor, said means including tension springs arranged in the manner of a V with the forward ends thereof being spread apart and secured to the floor and the rear ends secured to the frame at a generally common location, the major portion of the surface area of the V as defined by the springs being confined under the driver's sitting area, said latter area being situated only on one side of the center of the lengthwise dimension of the frame.

2. Apparatus as set forth in claim 1 wherein a tie rod extends between and is anchored to the front and rear frame rails and the rear ends of the springs are anchored to the tie rod.

3. Apparatus as set forth in claim 2 wherein the tie rod has an eye formed therein to which the spring ends are connected and the rod is bent near the eye to permit the springs to lie in a plane which approaches the plane of movement of the seat frame.

4. For use with an automotive vehicle having a floor, a seat assembly comprising: guide rails spaced apart and anchored to the floor; a seat frame carried on the guide rails and movable rectilinearly forwardly and rearwardly relative thereto, said seat frame extending crosswise of the vehicle floor and being of sufficient length to accommodate at least two human passengers in side by side relationship, thereby defining a driver's sitting area and an adjacent passenger's sitting area; means for lessening the tendency of the seat frame to deviate from a rectilinear path of movement relative to the guide rails and for urging the frame forwardly relative to the guide rails and the floor, said means including springs having their opposite ends anchored respectively to the seat frame and to the floor and being arranged so as to diverge relative to each other, whereby the points of anchoring at common ends thereof are spread apart farther than the points of anchoring at the remaining common ends and the major portion of the surface area defined within the boundaries of the diverging springs is confined under the driver's sitting area, said latter area being situated only on one side of the center of the lengthwise dimension of the frame.

5. Apparatus as set forth in claim 4 wherein the ends of the springs which are anchored to the frame are anchored at a substantially common location and the ends which are anchored to the floor are spread apart and are situated forwardly of the frame anchored ends.

References Cited in the file of this patent

UNITED STATES PATENTS

| | | |
|---|---|---|
| 769,843 | Smith | Sept. 13, 1904 |
| 1,714,936 | Warner | May 28, 1929 |
| 1,724,535 | Van Auken | Aug. 13, 1929 |
| 2,469,243 | Rivard | May 3, 1949 |